United States Patent [19]

Smalley

[11] Patent Number: 4,501,371
[45] Date of Patent: Feb. 26, 1985

[54] TAMPER INDICATING, NON-RESEALABLE CLOSURE

[75] Inventor: Ned J. Smalley, Perrysburg, Ohio

[73] Assignee: Owens-Illinois, Inc., Toledo, Ohio

[21] Appl. No.: 558,141

[22] Filed: Dec. 5, 1983

[51] Int. Cl.³ .............................................. B65D 41/48
[52] U.S. Cl. ................................... 215/232; 215/254; 220/257; 220/258; 220/359
[58] Field of Search ................ 215/232, 254; 220/257, 220/258, 359

[56] References Cited

U.S. PATENT DOCUMENTS

| 3,130,056 | 4/1964 | Taylor et al. | 215/254 X |
| 3,142,404 | 7/1964 | Krieps et al. | 215/254 |
| 3,632,004 | 1/1972 | Grimes | 215/232 |
| 3,963,141 | 6/1976 | Liu | 215/254 |
| 4,280,653 | 7/1981 | Elias | 220/359 X |

Primary Examiner—Donald F. Norton
Attorney, Agent, or Firm—John R. Nelson; Myron E. Click

[57] ABSTRACT

A non-reusable tamper indicating package comprising a container and a closure. The container has a body portion and a neck portion defining an opening and having an annular bead spaced from the end of the neck. The closure has a top wall and a peripheral skirt and a retention and holding bead on the skirt adapted to engage the annular bead on the container. The closure includes spaced score lines on the skirt and a portion of the top wall defining a severable portion of the skirt between the score lines such that when the severable portion is pulled outwardly and upwardly, the closure is severed along the score lines. A foil sheet having a layer of thermoplastic material on each surface thereof and is thermally bonded to the upper end of the container. A liner ring overlies the foil sheet and is thermally bonded to the thermoplastic material on the foil. The top wall has a depending portion thermally bonded to the thermoplastic material on the foil sheet such that when the severable portion of the skirt and top wall are severed along the score lines, the depending portion of the closure tears the foil sheet to provide access to the contents and the foil sheet can not be reused and the closure can not be reused to reseal a container.

16 Claims, 8 Drawing Figures

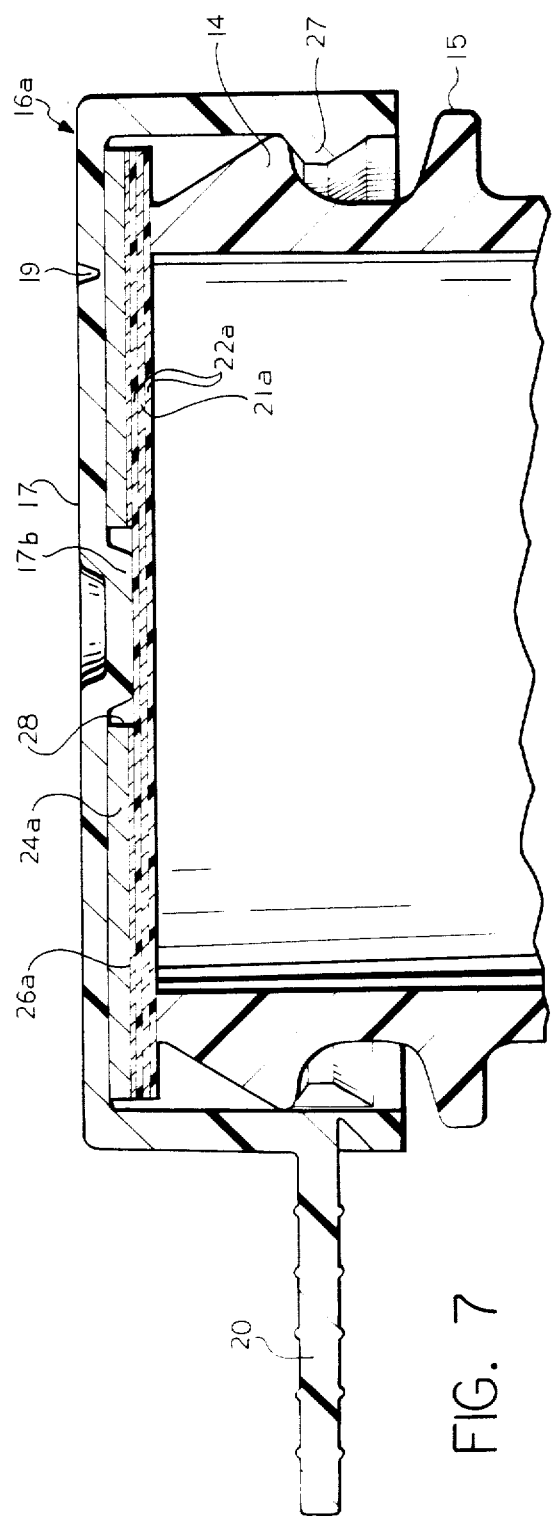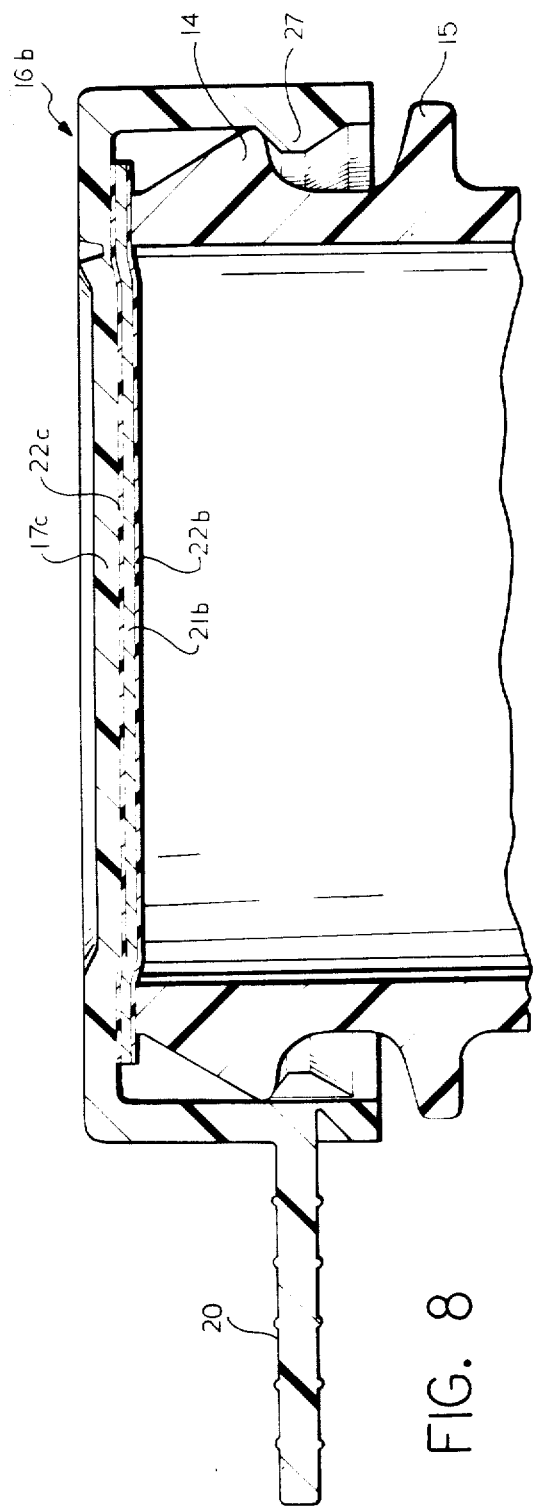

4,501,371

TAMPER INDICATING, NON-RESEALABLE CLOSURE

This invention relates to tamper indicating packages and particularly to tamper indicating packages which are not to be reused.

BACKGROUND AND SUMMARY OF THE INVENTION

In the packaging of certain products such as liquid chlorine bleach and the like, it is desirable to provide a single use package which can not be reused and yet which will have an indication of possible tampering.

Accordingly among the objectives of the present invention are to provide a single usage tamper resistant package which will adequately seal the contents, will not be resealable, and wherein neither the sealing device nor the closure can be reused and wherein preferably a portion of the closure remains with the bottle or container.

In accordance with the invention, the non-reusable temper indicating package comprises a container and a closure. The container has a body portion and a neck portion defining an opening and the neck portion has an annular bead spaced from the end of the neck. The closure has a top wall and a peripheral skirt and a retention and holding bead on the skirt adapted to engage the annular bead on the container. The closure includes spaced score lines on the skirt and a portion of the top wall defining a severable portion between the score lines such that when the severable portion is pulled outwardly and upwardly, the closure is severed along the score lines. A foil sheet has a layer of thermoplastic material on each surface thereof and is thermally bonded to the upper end of the container. A liner ring overlies the foil sheet and is thermally bonded to the thermoplastic material of the foil. The top wall has a depending portion thermally bonded to the thermoplastic material on the foil sheet such that when the severable portion of the skirt and top wall are severed along the score lines, the depending portion of the closure tears the foil sheet to provide access to the contents and the foil sheet can not be reused and the closure can not be reused to reseal a container. In a modified form, the liner is eliminated and the depending portion is thermally bonded directly to foil sheet.

DESCRIPTION OF THE DRAWINGS

FIG. 7 is a view similar to FIG. 4 of a modified form of package.

FIG. 8 is a view similar to FIG. 4 of a further form of package.

DESCRIPTION

Figure 2:
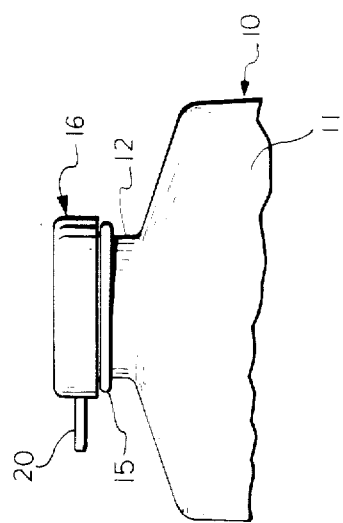
FIG. 2 is a plan view of the package.
Figure 3:
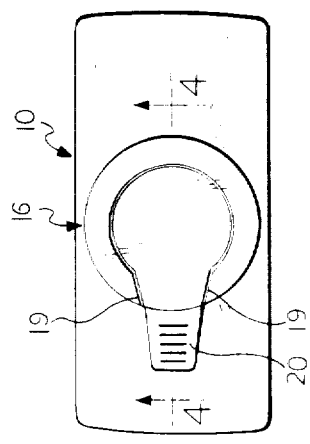
FIG. 3 is a fragmentary side elevational view of the package.
Figure 1:
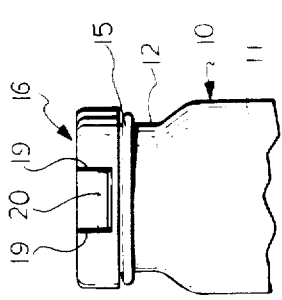
FIG. 1 is a fragmentary elevational view of a tamper indicating package embodying the invention.
Figure 4:
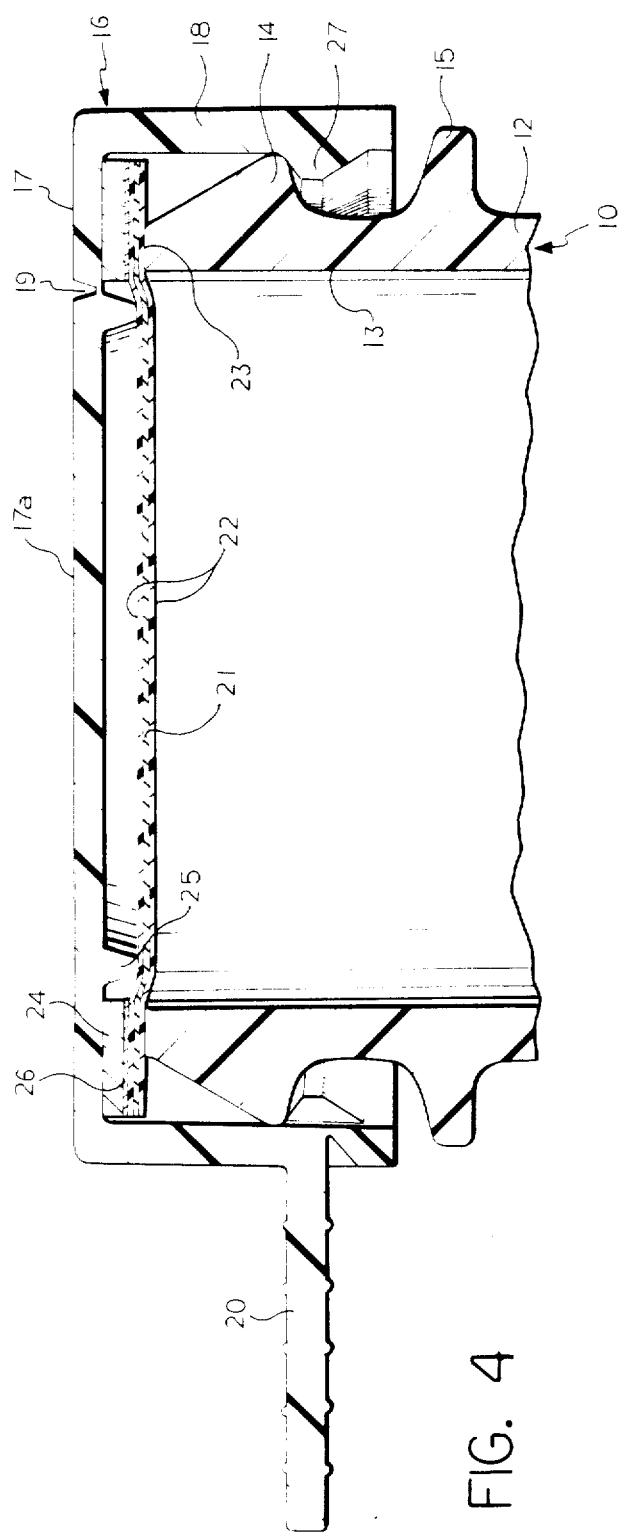
FIG. 4 is a fragmentary sectional view on an enlarged scale taken along the line 4—4 in FIG. 2.
Figures 5, 6:
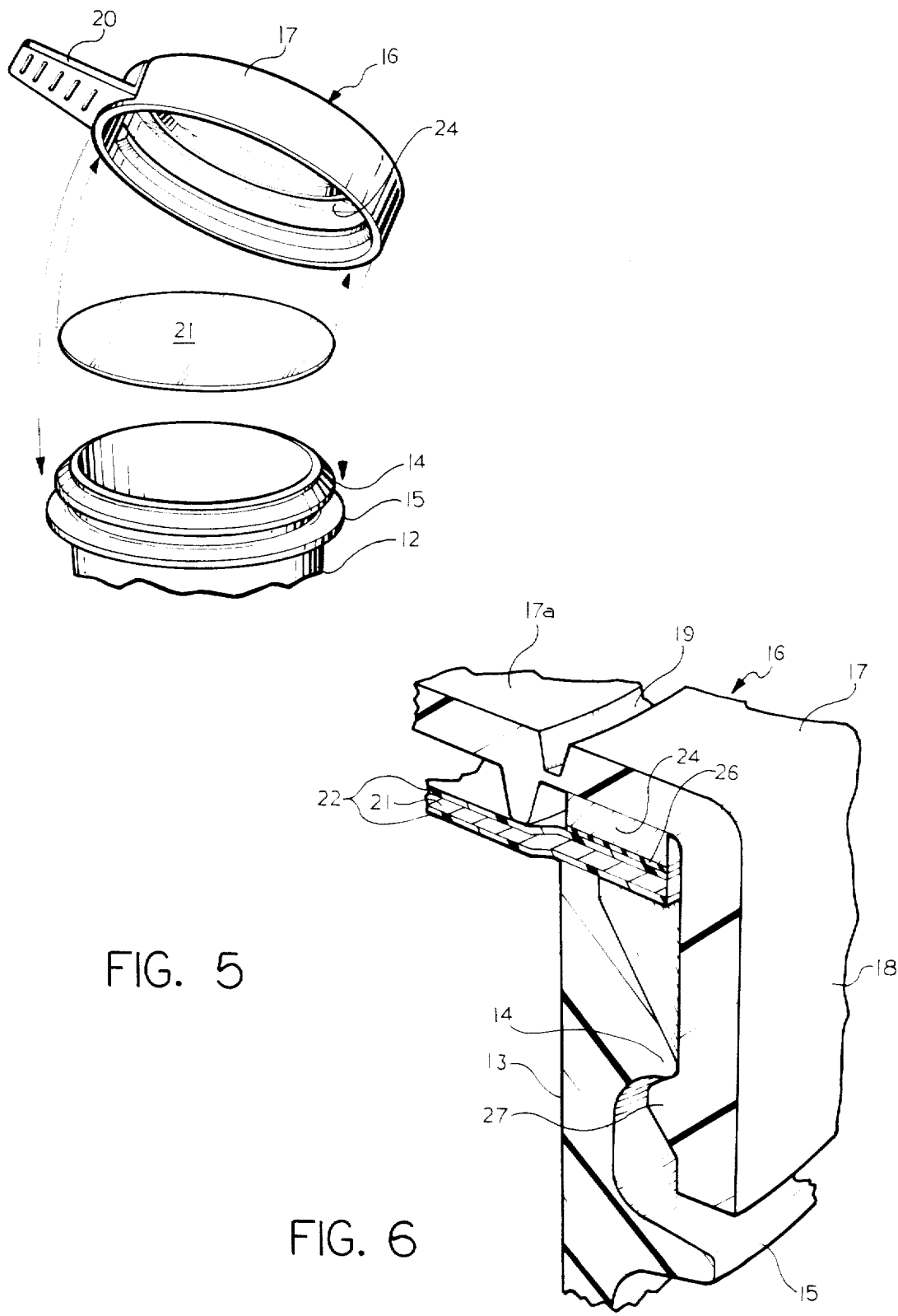
FIG. 5 is an exploded perspective view of the package.
FIG. 6 is a fragmentary sectional view of the package.

Referring to FIGS. 1–6, the tamper indicating package comprises a container 10 such as a bottle of glass or plastic that has a body portion 11 and a neck 12 defining a neck opening 13. The neck 12 is formed with a radially outwardly extending annular bead 14 and a spaced radial flange 15 below the bead 14. The package further includes a closure 16 of plastic such as polypropylene or high density polyethylene and includes a top wall 17 and a peripheral skirt 18. The closure 16 includes spaced score lines 19 extending axially along the skirt and along the top wall 17 and connected to one another along the top wall generally radially inwardly of the upper edge of the container 10 when the closure 15 is on the container 10. A radial tab 20 extends from the portion of the skirt 18 between the score lines 19 to facilitate upward movement of the portion between the score lines 19 so that the skirt 18 and a portion 17a of the top wall 17 can be severed and removed from the remainder of the closure 15 which will stay on the container 10 as presently described.

A liner 21 comprising a metal foil sheet, such as aluminum having a thin thermoplastic film 22 such as polyethylene on both surfaces thereof, is applied over the upper end 23 of the container and a pulp liner ring 24 is positioned over the aluminum liner 21 in overlying relation to the upper end of the finish of the container. The top wall 17 of the closure 16 further includes an annular axially inwardly depending portion 25 engaging the foil sheet 22 radially inwardly of the neck 12. Pulp liner ring 24 is preferably made of paper so that it forms a resilient liner and is coated with a thin layer 26 of wax "adjacent the top film 22".

The foil may typically have a thickness of 5–8 mils and a layer of thermoplastic film of 1 mil. The pulp liner may typically have a thickness of 30–35 mils.

The closure 16 further includes an annular retention and locking bead 27 on the inner surface of the skirt 18 that is interrupted adjacent tab 20 extending radially inwardly and adapted to snap over and engage under the annular retention bead 14. When the closure 16 is in position, the flange 15 extends into close proximity with the free edge of the skirt 18 so that a closure can not be pried off by hand or by a tool such as a screw driver.

In assembly, the pulp ring 24 and aluminum foil 22 are inserted in the closure 15 and retained therein by the retention bead 27. After the product has been introduced into the container 10, the closure 15 is applied causing the retention bead 26 to snap over the annular bead 14 on the container 10. The package is then subjected to heat as from an infra-red source causing thermoplastic film 22 and wax layer 26 to melt and provide a bond between the liner 21 and the upper end 23 of the finish, between the pulp ring 24 and the metal liner 21, and between the depending portion 25 and the metal liner 21.

In this fashion, the metal liner 21 defines a tamper indicating device. When the user desires to open the package, the tab 20 is grasped and the severable portion 17a of the closure 16 between the score line is severed by an upward and radially inward movement. This action causes the depending portion 25 to tear the aluminum sheet liner 21 and to provide access to the contents. A portion of the closure will remain on the container. In addition, the pulp liner 24 and the underlying portion of the foil 21 will also remain on the container.

In the form of the invention shown in FIG. 7, the closure 16a has a depending portion 17b comprises a centrally located deformed portion of the closure 16a which extends axially inwardly. The pulp liner 24a with flim 26a of wax thereon extends over substantially the entire upper surface of the foil sheet 21a except for a central opening 28 through which the depending portion 17b extends and is thermally bonded by the thermoplastic film 22a to the foil sheet 21a.

In the form shown in FIG. 8, the pulp liner is eliminated and the closure 16b includes a central portion 17c of the closure that is downwardly depressed and thermally bonded directly to the foil sheet 21b by thermoplastic film 22b.

It can thus be seen that there has been provided a single use tamper indicating package which will provide, can not be reused, and severs both the liner and the closure.

I claim:

1. A non-reusable tamper indicating package comprising
   a container having a body portion and a neck portion defining an opening,
   said neck portion having an annular bead spaced from the end of the neck,
   a closure having a top wall and a peripheral skirt,
   said closing having a retention and lacking bead on the skirt thereof adapted to engage the annular bead on the container,
   said closure including spaced score lines on the skirt and a portion of the top wall such that when the portion of the skirt between the score lines is pulled outwardly and upwardly, the closure is severed along the score lines,
   a foil sheet having a layer of thermoplastic material on each surface thereof thermally bonded to the upper end of the container,
   said top wall having a depending portion thermally bonded to the thermoplastic material on the foil sheet such that when the portion of the skirt and top wall are severed along the score lines the depending portion tears the foil sheet to provide access to the contents and the foil sheet can not be reused and the closure can not be reused to reseal a container.

2. The tamper indicating package set forth in claim 1 wherein said skirt is provided with a radial tab in the portion between the score lines to facilitate grasping the skirt to sever it from the remainder of the skirt.

3. The tamper indicating package set forth in claim 1 wherein said thermoplastic material comprises polyethylene.

4. The tamper indicating package set forth in claim 1 wherein said spaced score lines are connected to one another in the top wall of the container such that a portion of the skirt and top wall are completely removed leaving a portion of the foil sheet closure on the container.

5. The tamper indicating package set forth in claim 1 wherein said retention and locking bead is circumferentially interrupted.

6. The tamper indicating package set forth in claim 1 wherein said closure is made of plastic material.

7. The tamper indicating package set forth in any of claims 1 to 6 including a resilient liner ring overlying the foil sheet and the finish of the container and thermally bonded to the thermoplastic material of the foil sheet.

8. The tamper indicating package set forth in claim 7 wherein said liner ring is made of paper pulp.

9. A non-reusable tamper indicating closure for a container having a body portion and a neck portion defining an opening, and an annular bead spaced from the end of the neck,
   said closure having a top wall and a peripheral skirt,
   said closure having a retention and locking bead on the skirt thereof adapted to engage the annular bead on a container,
   said closure including spaced score lines on the skirt and a portion of the top wall such that when the portion of the skirt between the score lines is pulled outwardly and upwardly, the closure is severed along the score lines,
   a foil sheet having a layer of thermoplastic material on each surface thereof adapted to be thermally bonded to the upper end of a container,
   said top wall having a depending portion adapted to be thermally bonded to the thermoplastic material on the foil sheet such that when the portion of the skirt and top wall are severed along the score lines, the depending portion tears the foil sheet to provide access to the contents of a container and the foil sheet can not be reused and the closure can not be reused to reseal a container.

10. The tamper indicating closure set forth in claim 9 wherein said skirt is provided with a radial tab in the portion between the score lines to facilitate grasping the skirt to sever it from the remainder of the skirt.

11. The tamper indicating closure set forth in claim 9 wherein said thermoplastic material comprises polyethylene.

12. The tamper indicating closure set forth in claim 9 wherein said spaced score lines are connected to one another in the top wall of the container such that a portion of the skirt and top wall are completely removed leaving a portion of the foil sheet and closure on the container.

13. The tamper indicating closure set forth in claim 9 wherein said retention and locking bead is circumferentially interrupted.

14. The tamper indicating closure set forth in claim 9 wherein said closure is made of plastic material.

15. The tamper indicating closure set forth in any of claims 9 to 14 including a liner ring overlying the foil sheet and the finish of the container and thermally bonded to the thermoplastic material of the foil.

16. The tamper indicating closure set forth in claim 15 wherein said liner ring is made of paper pulp.

* * * * *